United States Patent
Chai et al.

(10) Patent No.: US 12,400,388 B2
(45) Date of Patent: Aug. 26, 2025

(54) UNSUPERVISED VOLUMETRIC ANIMATION

(71) Applicants: Menglei Chai, Los Angeles, CA (US); Hsin-Ying Lee, San Jose, CA (US); Willi Menapace, Santa Monica, CA (US); Kyle Olszewski, Los Angeles, CA (US); Jian Ren, Hermosa Beach, CA (US); Aliaksandr Siarohin, Los Angeles, CA (US); Ivan Skorokhodov, Los Angeles, CA (US); Sergey Tulyakov, Santa Monica, CA (US)

(72) Inventors: Menglei Chai, Los Angeles, CA (US); Hsin-Ying Lee, San Jose, CA (US); Willi Menapace, Santa Monica, CA (US); Kyle Olszewski, Los Angeles, CA (US); Jian Ren, Hermosa Beach, CA (US); Aliaksandr Siarohin, Los Angeles, CA (US); Ivan Skorokhodov, Los Angeles, CA (US); Sergey Tulyakov, Santa Monica, CA (US)

(73) Assignee: Snap Inc., Santa Monica, CA (US)

(*) Notice: Subject to any disclaimer, the term of this patent is extended or adjusted under 35 U.S.C. 154(b) by 246 days.

(21) Appl. No.: 18/089,984

(22) Filed: Dec. 28, 2022

(65) Prior Publication Data
US 2024/0221258 A1  Jul. 4, 2024

(51) Int. Cl.
G06T 13/40 (2011.01)
G06T 7/70 (2017.01)
G06T 19/20 (2011.01)

(52) U.S. Cl.
CPC ............... G06T 13/40 (2013.01); G06T 7/70 (2017.01); G06T 19/20 (2013.01);
(Continued)

(58) Field of Classification Search
CPC . G06T 7/70; G06T 19/20; G06T 2207/20081; G06T 2207/20084;
(Continued)

(56) References Cited

U.S. PATENT DOCUMENTS

| 8,139,067 B2* | 3/2012 | Anguelov | G06T 17/00 345/475 |
| 2017/0071508 A1* | 3/2017 | Kaiser | A61B 5/11 |
| 2021/0248772 A1* | 8/2021 | Iqbal | G06N 5/04 |

OTHER PUBLICATIONS

Chen, X., Jiang, T., Song, J., Rietmann, M., Geiger, A., Black, M. J., & Hilliges, O. (2023). Fast-SNARF: A fast deformer for articulated neural fields.Â IEEE Transactions on Pattern Analysis and Machine Intelligence,Â 45(10), 11796-11809. (Year: 2022).*

(Continued)

*Primary Examiner* — Kee M Tung
*Assistant Examiner* — Nauman U Ahmad
(74) *Attorney, Agent, or Firm* — CM Law; Stephen J. Weed (57) ABSTRACT

Unsupervised volumetric 3D animation (UVA) of non-rigid deformable objects without annotations learns the 3D structure and dynamics of objects solely from single-view red/green/blue (RGB) videos and decomposes the single-view RGB videos into semantically meaningful parts that can be tracked and animated. Using a 3D autodecoder framework, paired with a keypoint estimator via a differentiable perspective-n-point (PnP) algorithm, the UVA model learns the underlying object 3D geometry and parts decomposition in an entirely unsupervised manner from still or video images. This allows the UVA model to perform 3D segmentation, 3D keypoint estimation, novel view synthesis, and animation. The UVA model can obtain animatable 3D objects from a single or a few images. The UVA method also features a space in which all objects are represented in their canonical, (Continued)

animation-ready form. Applications include the creation of lenses from images or videos for social media applications.

20 Claims, 7 Drawing Sheets

(52) U.S. Cl.
CPC .............. *G06T 2207/20081* (2013.01); *G06T 2207/20084* (2013.01); *G06T 2207/30201* (2013.01); *G06T 2219/2004* (2013.01); *G06T 2219/2021* (2013.01)

(58) Field of Classification Search
CPC ... G06T 2207/30201; G06T 2219/2004; G06T 2219/2021; G06T 15/08; G06T 17/00
See application file for complete search history.

(56) References Cited

OTHER PUBLICATIONS

Peng, S., Xu, Z., Dong, J., Wang, Q., Zhang, S., Shuai, Q., . . . & Zhou, X. (2024). Animatable implicit neural representations for creating realistic avatars from videos.Â IEEE Transactions on Pattern Analysis and Machine Intelligence. (Year: 2022).*

Huang, Z., Xu, Y., Lassner, C., Li, H., & Tung, T. (2020). Arch: Animatable reconstruction of clothed humans. InÂ Proceedings of the IEEE/CVF Conference on Computer Vision and Pattern RecognitionÂ (pp. 3093-3102). (Year: 2020).*

Wu, S., Rupprecht, C., & Vedaldi, A. (2020). Unsupervised learning of probably symmetric deformable 3d objects from images in the wild. InÂ Proceedings of the IEEE/CVF conference on computer vision and pattern recognitionÂ (pp. 1-10) (Year: 2020).*

Habermann, M., Xu, W., Zollhoefer, M., Pons-Moll, G., & Theobalt, C. (2021). A deeper look into deepcap. IEEE Transactions on Pattern Analysis and Machine Intelligence, 45(4), 4009-4022. (Year: 2021).*

J. Y. Chang, G. Moon and K. M. Lee, "V2V-PoseNet: Voxel-to-Voxel Prediction Network for Accurate 3D Hand and Human Pose Estimation from a Single Depth Map," 2018 IEEE/CVF Conference on Computer Vision and Pattern Recognition, Salt Lake City, UT, USA, 2018, pp. 5079-5088, doi: 10.1109/CVPR.2018.00533. (Year: 2018).*

Kaneko, Takuhiro. "Ar-nerf: Unsupervised learning of depth and defocus effects from natural images with aperture rendering neural radiance fields." Proceedings of the IEEE/CVF Conference on Computer Vision and Pattern Recognition (2022). (Year: 2022).*

Aliaksandr Siarohin et al: "Motion Representations for Articulated Animation", Arxiv.Org, Cornell University Library, 201 Olin Library Cornell University Ithaca, NY 14853, Apr. 22, 2021 (Apr. 22, 2021).

Ben Mildenhall et al: "NeRF: Representing Scenes as Neural Radiance Fields for View Synthesis", Arxiv.org, Cornell University Library, 201 Olin Library Cornell University Ithaca, NY 14853, Aug. 4, 2020 (Aug. 4, 2020).

International Search Report and Written Opinion for International Application No. PCT/US2023/085298, dated May 6, 2024 (Jun. 5, 2024)—10 pages.

Lewis J P et al: "Pose space deformation a unified approach to shape interpolation and skeleton-driven deformation", Computer Graphics. Siggraph 2000 Conference Proceedings. New Orleans, LA, Jul. 23-28, 2000; [Computer Graphics Proceedings. Siggraph], New York, NY: ACM, US, Jul. 1, 2000 (Jul. 1, 2000), pp. 165-172.

Vincent Lepetit et al: "EPnP: An Accurate O(n) Solution to the PnP Problem", Arxiv.org, vol. 81, No. 2, Jul. 19, 2008 (Jul. 19, 2008), pp. 155-166, XP000055627426, 201 Olin Library Cornell University Ithaca, NY 14853.

* cited by examiner

UNSUPERVISED VOLUMETRIC ANIMATION

TECHNICAL FIELD

Examples set forth herein generally relate to generation of three-dimensional (3D) animatable avatars and, in particular, to methods and systems for training from images or videos to facilitate unsupervised generation of 3D animatable avatars.

BACKGROUND

The ability to realistically animate a dynamic object seen in a single image enables compelling creative tasks. Such applications range from tractable and cost-effective approaches to visual effects for cinema and television, to more lightweight consumer applications (e.g., enabling arbitrary users to create "performances" by famous modern or historical figures). However, this requires understanding the object's structure and motion patterns from a single static depiction. Efforts in this field are primarily divided into two approaches: those that outsource this understanding to existing, off-the-shelf models specific to an object category that capture its particular factors of variation; and those that learn the object structure from the raw training data itself. The former group employs supervision, and thus requires knowledge about the animated object (e.g., the plausible range of shapes and motions of human faces or bodies). The latter group is unsupervised, providing the flexibility needed for a wider range of arbitrary object categories.

Significant progress has been made recently in the domain of unsupervised image animation. Prior art methods typically learn a motion model based on object parts and the corresponding transformations applied to them. Initially, such transformations were modeled using a simple set of sparse keypoints. Other prior art improved the motion representation, learned latent motion dictionaries, kinematic chains, or used thin-plate spline transformations. However, broadly speaking, such prior art proposed 2D motion representations and warping the pixels or features of the input image such that they correspond to the pose of a given driving image. As such, unsupervised animation methods in the prior art offer means to perform 2D animation only, and are inherently limited in modeling complex, 3D effects, such as occlusions, viewpoint changes, and extreme rotations, which can only be explained and addressed appropriately when considering the 3D nature of the observed objects.

3D-aware image and video synthesis has recently experienced substantial progress. Neural Radiance Fields (NeRFs) have been used as a 3D representation to synthesize simple objects and often considered synthetic datasets. Other prior art methods scaled the generator and increased its efficiency to attain high-resolution 3D synthesis. Such prior art relies on different types of volumetric representations such as a coordinate-MLP, voxel-grids, tri-planes, generative manifolds, multi-plane representations, and signed distance functions. Other prior art methods combined implicit video synthesis techniques with that of volumetric rendering to generate 3D-aware videos. However, a common requirement of these prior art methods is access to the ground truth camera distribution or even the known camera poses for each training image. This gives a strong inductive bias towards recovering the proper 3D geometry.

Supervised image animation requires an off-the-shelf keypoint predictor or a 3D morphable model (3DMM) estimator to run through the training dataset prior to training. To train such an estimator, large amounts of labeled data are needed. Supervised animation is typically designed for only one object category, such as bodies or faces. Some prior art supervised animation methods support only a single object identity, while others support single-shot or few-shot cases.

Thanks to significant advances in neural rendering and 3D-aware synthesis, several prior art methods have extended supervised animation to the 3D domain. Initially, a dataset with multiview videos was required to train animatable radiance fields. Later, HumanNeRF and NeuMan methods showed the feasibility of leveraging only a monocular video of the same subject. However, these models require fitting of a 3D model of human bodies to every frame of a video. Such methods typically do not support multiple identities with the same framework.

Unsupervised image animation methods in the prior art do not require supervision beyond photometric reconstruction loss and, hence, support a variety of object categories with one framework. Unsupervised image animation methods of the prior art are designed to appropriate motion representations for animation. A number of improved representations have been proposed, such as those setting additional constraints on a kinematic tree, and thin-plate spline motion modelling. A latent image animator has been proposed that has learned a latent space for possible motions whereby a direction in the latent space is found to be responsible for generating novel views of the same subject. However, as with 2D image generators, the direction cannot be reliably used to synthesize the novel views.

BRIEF DESCRIPTION OF THE DRAWINGS

In the drawings, which are not necessarily drawn to scale, like numerals may describe similar components in different views. Some nonlimiting examples are illustrated in the figures of the accompanying drawings in which.

DETAILED DESCRIPTION

Unsupervised volumetric 3D animation (UVA) of non-rigid deformable objects without annotations learns the 3D structure and dynamics of objects solely from single-view red/green/blue (RGB) videos and decomposes the single-view RGB videos into semantically meaningful parts that can be tracked and animated. Using a 3D autodecoder framework, paired with a keypoint estimator via a differentiable perspective-n-point (PnP) algorithm, the UVA model learns the underlying object 3D geometry and parts decomposition in an unsupervised manner from still or video images. This allows the UVA model to perform 3D segmentation, 3D keypoint estimation, novel view synthesis, and animation. The UVA model can obtain animatable 3D objects from a single or a few images.

The UVA method shows that it is possible to learn rich geometry and object parts decomposition in an unsupervised manner in a non-adversarial framework. The UVA method also features a space in which objects are represented in their canonical, animation-ready form. Applications include the creation of augmented reality (AR)/virtual reality (VR) overlays ("lenses") from images or videos for social media applications.

The unsupervised volumetric animation (UVA) system and corresponding methods described herein provide three-dimensional (3D) animation of a non-rigid deformable object. The UVA system includes a canonical voxel generator to produce a volumetric representation of the non-rigid deformable object, wherein the non-rigid deformable object is represented as a set of moving rigid parts, and to assign each 3D point of the non-rigid deformable object to a corresponding moving rigid part of the non-rigid deformable object. A two-dimensional (2D) keypoint predictor estimates a pose, in a given image frame, of each moving rigid part of an input object to be animated, and a volumetric skinning algorithm maps a canonical object volume of the non-rigid deformable object into a deformed volume that represents the input object to be animated with the pose in a current frame. A volumetric renderer renders the deformed object as an image of the input object. In example configurations, the input object to be animated is extracted from a video or a still image.

In the example configurations, the 2D keypoint predictor uses a pose extracted from the input object to be animated to predict a set of 2D keypoints that correspond to 3D keypoints of the object to be animated. The 2D keypoint predictor estimates the pose of each moving rigid part by learning a set of 3D keypoints in a canonical space and includes a 2D convolutional neural network that detects 2D projections of the moving rigid part to provide a set of corresponding 2D keypoints in a current frame. A perspective-n-point (PnP) algorithm processes a differentiable PnP formulation to recover the pose of each moving rigid part from corresponding 2D keypoints and 3D keypoints. The 2D keypoint predictor introduces $N_k$ learnable canonical 3D keypoints for each moving rigid part, shares 3D keypoints $K_p^{3D}$ of the moving rigid part among objects in a dataset, defines a 2D keypoints prediction network C that takes frame $F_i$ as input and outputs 2D keypoints $K_p^{2D}$ for each part p, where each 2D keypoint corresponds to its respective 3D keypoint, and recovers the pose of moving rigid part p as:

$$T_p^{-1} = PnP(K_p^{2D}, K_p^{3D}) = PnP(C(F_i), K_p^{3D}).$$

In example configurations, the volumetric renderer takes a deformed density and radiance of the deformed volume produced via volumetric skinning using a canonical density ($V^{DENSITY}$) of the non-rigid deformable object, a radiance from the non-rigid deformable object, a set of poses for different moving rigid parts of the input object to be animated, and moving rigid parts of the input object to be animated represented as Linear Blend Skinning (LBS) weights. The volumetric renderer volumetrically renders the deformed radiance to produce the animation image.

A detailed description of the methodology for unsupervised volumetric animation will now be described with reference to FIGS. 1-7. Although this description provides a detailed description of possible implementations, it should be noted that these details are intended to be exemplary and in no way delimit the scope of the inventive subject matter.

The UVA examples described herein explore unsupervised image animation in 3D. This setting is substantially more challenging compared to classical 2D animation for several reasons. First, as the predicted regions or parts now exist in a 3D space, it is challenging to identify and plausibly control them from only 2D videos without extra supervision. Second, this challenge is further compounded by the need to properly model the distribution of the camera in 3D, which is a problem in its own right, with multiple 3D generators resorting to existing pose predictors to facilitate the learning of the underlying 3D geometry. Also, in 3D space, there exists no obvious and tractable counterpart for the bias of 2D convolutional neural networks (CNNs), which are a requirement for prior art unsupervised keypoint detection frameworks for 2D images.

Examples of the UVA framework described herein map an embedding of each object to a canonical volumetric representation, parameterized with a voxel grid, containing volumetric density and appearance. To allow for non-rigid deformations of the canonical object representation, it is assumed that the object consists of a certain number of rigid parts which are softly assigned to each of the points in the canonical volume. A procedure based on linear blend skinning (LBS) is employed to produce the deformed volume according to the pose of each part. However, rather than directly estimating the poses, a set of learnable 3D canonical keypoints are introduced for each part, and the 2D inductive bias of 2D CNNs is leveraged to predict a set of corresponding 2D keypoints in the current frame. A differentiable Perspective-n-Point (PnP) algorithm is used to estimate the corresponding pose, explicitly linking 2D observations to the 3D representation.

The resulting UVA framework allows the knowledge from 2D images to be propagated to the 3D representation, thereby learning rich and detailed geometry for diverse object categories using a photometric reconstruction loss as the driving objective. The parts are learned in an unsupervised manner, yet they converge to meaningful volumetric object constituents. For example, for faces, they correspond to the jaw, hair, neck, and the left and right eyes and cheeks. For bodies, the same approach learns parts to represent the torso, head, and each hand. Examples of these parts are shown in FIG. 1.

Figure 1:
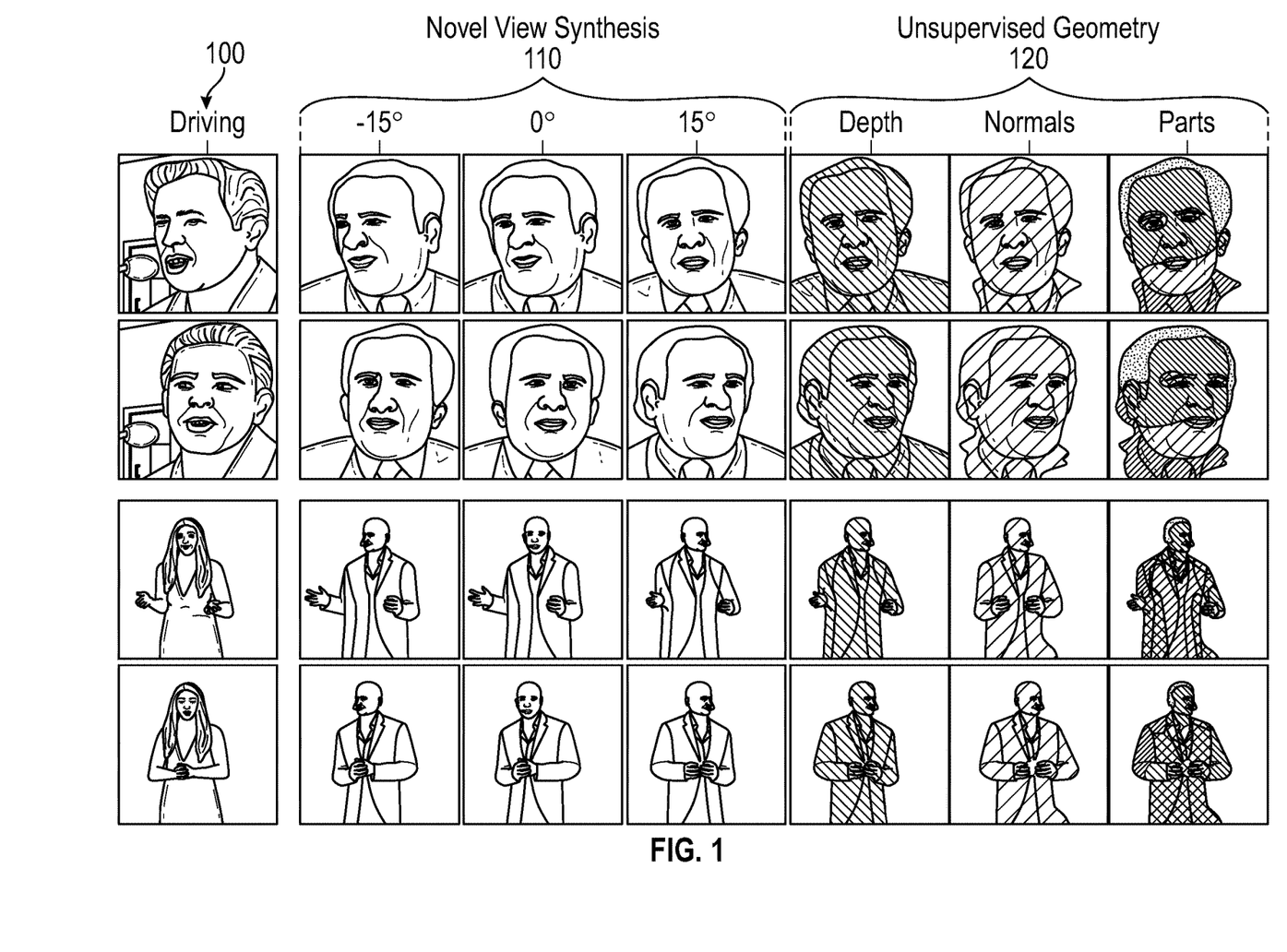
FIG. 1 is an illustration depicting selected animation results for faces and bodies using the Unsupervised Volumetric Animation (UVA) method in an example configuration that takes a 3D representation of an object (e.g., photos of a human) and generates views from other viewpoints based on a driving image.

FIG. 1 illustrates selected animation results for faces and bodies using the Unsupervised Volumetric Animation (UVA) method described herein that takes a 3D representation of an object (e.g., photos of a human) and generates views from other viewpoints based on a driving image. Given a driving image sequence 100 and a source image (not shown), the UVA method renders realistic animations and simultaneously generates novel views 110 of the animated object. With low reconstruction loss, the UVA method also generates high-fidelity depth and normals and identifies semantically meaningful object parts of unsupervised geometry (120).

To simplify the optimization, a two-stage strategy is used which includes learning a single part such that the overall geometry is learned and then allowing the model to discover the remaining parts so that animation is possible. When the object is represented with a single part, the model can perform 3D reconstruction and novel view synthesis. When more parts are used, the UVA method not only identifies meaningful object parts but also performs non-rigid animation and novel view synthesis at the same time. Examples of images animated using the UVA method are shown in FIG. 1.

The unsupervised volumetric 3D animation (UVA) method for animating non-rigid deformable objects implements a model that trains on a set of images $\{F_i, \alpha_i\}_{i=1}^{N_f}$, where $F_i \in R^{H \times W \times 3}$ is an image frame, $\alpha_i \in N$ is an object identifier, and $N_f$ is the number of frames in a video. It is assumed that which object instance appears in a video is known. In practice, this assumption is easily satisfied by assigning the same identity to all the frames of a given video. The primary training objective of the UVA framework is the reconstruction task. Given a frame $F_i$ with identity $\alpha_i$, the UVA framework is reconstructed using four core components.

Figure 2:
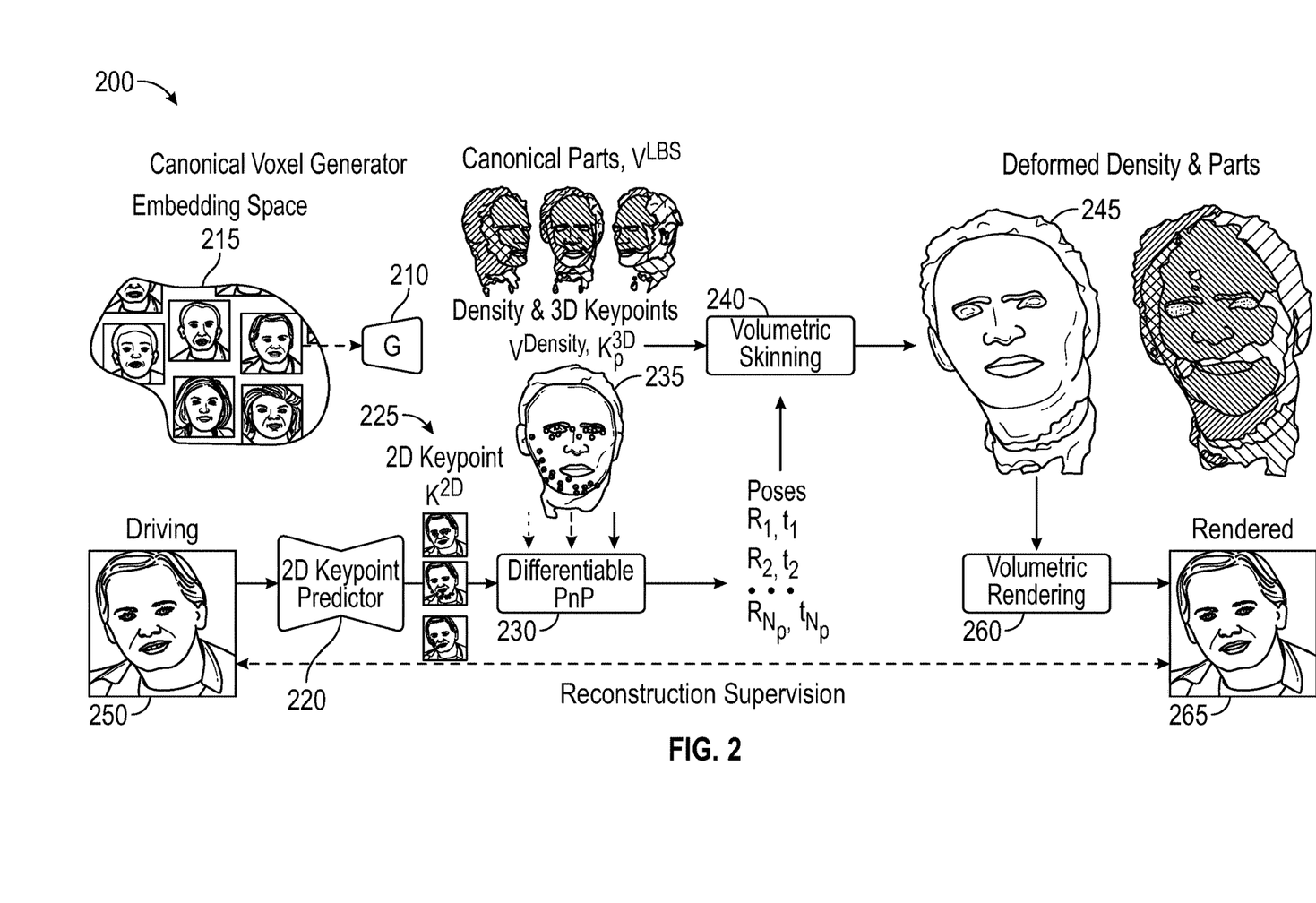
FIG. 2 is an illustration depicting an example configuration of the four core components of the UVA framework.
Figure 3:
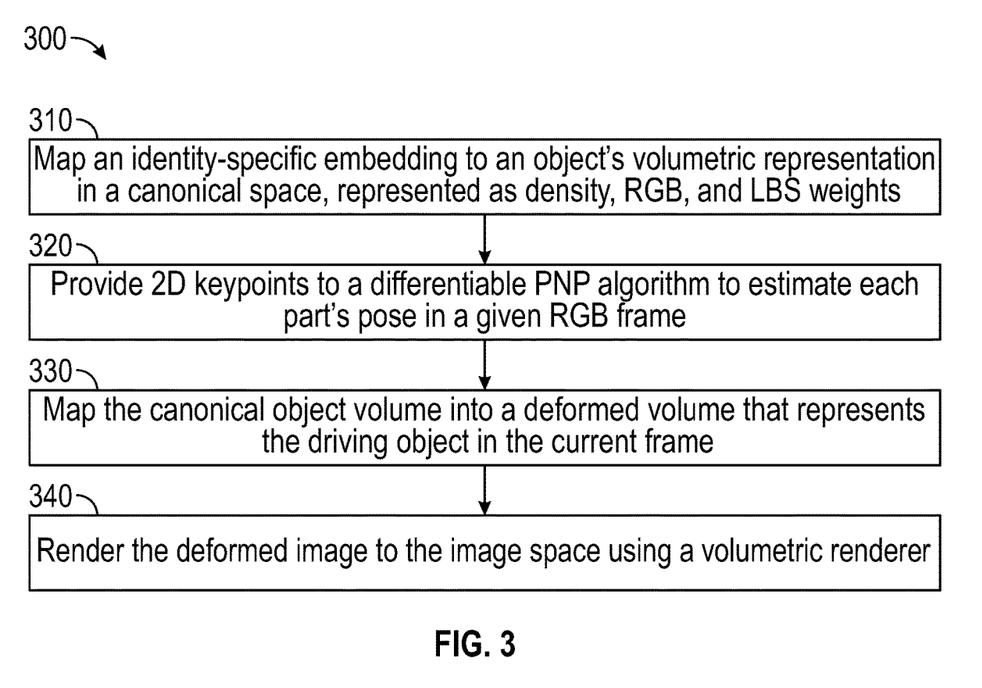
FIG. 3 is a flow chart illustrating the UVA method in an example configuration.

The four core components of the UVA framework 200 are illustrated in FIG. 2, and a flow chart illustrating the basic UVA method 300 is shown in FIG. 3. First, canonical voxel generator G 210 maps a learnable identity-specific embedding $e \in R^{Ne}$ 215 to an object's volumetric representation in the canonical pose, parametrized as a voxel grid, and represented as density, RGB, and LBS weights, at 310. It is assumed that each non-rigid object can be represented as a set of moving rigid parts. In this way, the canonical voxel generator 210 segments the volume and assigns each 3D point to its corresponding object's part. Next, at 320, the 2D keypoint predictor C 220 provides 2D keypoints ($K^{2D}$) to the differentiable PnP algorithm 230 to understand the 3D structure and movement of the input object (e.g., person's face) to estimate each part's pose (position and orientation) in a given RGB frame $F_i$. Subsequently, at 330, a volumetric skinning method 240 based on linear blend skinning (LBS) is employed to map the canonical object volume 235 into a deformed volume 245 that represents the driving object 250 in the current frame. Finally, at 340, volumetric rendering 260 is used to render the image 265 to the image space. The approach permits the structure and movement to be generalized across all object types represented in videos and still images provided as objects for training the UVA framework.

The canonical voxel generator G 210 maps a point in the latent space to the canonical density, radiance and canonical parts 235. In the embedding space 215, canonical shapes are shown rendered under an identity camera (the faces have the same shared pose with mouth open). For each part, a set of canonical 3D keypoints $K^3D$ is learned during training. The 2D keypoint predictor 220 uses a pose extracted from the driving image 250 to predict a set of 2D keypoints $K^{2D}$ 225 as poses that correspond to $K^{3D}$. The differentiable PnP algorithm 230 predicts the pose of each part. Canonical density ($V^{DENSITY}$), radiance from 3D keypoints ($K_P^{3D}$), a set of poses for different body parts ($R_{NP}$, $t_{NP}$) and parts ($V^{LBS}$) 235 are then used by the volumetric skinning method 240 to deform the canonical representation to compute the deformed density and radiance 245 via volumetric skinning. The deformed radiance is then volumetrically rendered by volumetric renderer 260 to produce the rendered image 265. It is noted that the UVA framework 200 does not use any knowledge about the object being animated and is supervised using the reconstruction loss.

Canonical Voxel Generator

A voxel grid V is used to parametrize the volume since it was found to provide an acceptable trade-off between generation efficiency, expressivity and rendering speed. Given an object's embedding $e \in R^{Ne}$, the canonical voxel generator G 210 is used to produce a volume cube of size S:

$$G(e) = V = [V^{Density} \| V^{RGB} \| V^{LBS}], \quad (1)$$

where $V^{Density} \in R^{S3}$ is the object's (discretized) density field in the canonical pose and $V^{RGB} \in R^{S3 \times 3}$ is its (discretized) RGB radiance field. To animate an object, it is assumed that the object can be modeled as a set of rigid moving parts $p \in \{1, 2, \ldots, N_P\}$, so $V^{LBS} \in R^{S3 \times N_P}$ is used to model a soft assignment of each point of the volume to one of the $N_p$ parts. No encoder is used to produce identity embeddings $e$ and instead optimizes the identity embeddings $e$ directly during training. Examples of canonical density, parts, and rendered canonical radiance 235 are shown in FIG. 2.

Unsupervised Pose Estimation

As described above, it is assumed that an object movement can be factorized into a set of rigid movements of each individual object's part p. However, detecting 3D part poses, especially in an unsupervised way, is a difficult task. Motion Representations for Articulated Animation (MRAA) shows that estimating 2D parts and their poses in an unsupervised fashion is an underconstrained problem, which utilizes specialized inductive biases to guide the pose estimation towards the proper solution. Such an inductive bias is incorporated in the UVA framework by framing pose prediction as a 2D landmark detection problem which CNNs can solve proficiently due to their natural ability to detect local patterns.

To lift this 2D bias into 3D to create 3D poses of body parts, the poses of 3D parts are estimated by learning a set of 3D keypoints in the canonical space and detecting their 2D projections in the current frame using a 2D CNN. A differentiable Perspective-n-Point (PnP) formulation is then used to recover the pose of each part (e.g., each part of a human) since its corresponding 2D and 3D keypoints are known. More formally, PnP is a problem where, given a set of the 3D keypoints $K^{3D} \in R^{Nk \times 3}$, a set of corresponding 2D projections $K^{2D} \in R^{Nk \times 2}$ and the camera intrinsics parameters, a camera pose $T = [R, t] \in R^{3 \times 4}$ is needed such that $K^{3D}$ projects to $K^{2D}$ when viewed from this pose. While T represents the pose of the camera with respect to the part, it is noted that in the UVA framework the camera extrinsics are considered to be constant and equal to the identity matrix, i.e., a part moves while the camera remains fixed. Recovering a part's pose with respect to the camera is performed by inverting the estimated pose matrix $T_P = [R_P, t_P] = [R^{-1}, -R^{-1}t]$.

In an example configuration, $N_k$ learnable canonical 3D keypoints $K_p^{3D}$ are introduced for each part, totaling $N_k \times N_p$. These 3D keypoints are shared among all the objects in a dataset, which are directly optimized with the rest of the UVA model's parameters. Then, a 2D keypoints prediction network C is defined, which takes frame $F_i$ as input and outputs $N_k$ 2D keypoints $K_p^{2D}$ for each part p, where each 2D keypoint corresponds to its respective 3D keypoint. The pose of part p can thus be recovered as:

$$T_p^{-1} = PnP(K_p^{2D}, K_p^{3D}) = PnP(C(F_i), K_p^{3D}). \quad (2)$$

In this formulation $K_p^{3D}$ are shared for all the objects in the dataset, thus all objects will share the same canonical space for poses. This property enables the performance of cross-subject animations, where poses are estimated on frames depicting a different identity.

In an example configuration, an o(n) solution for PnP (EPnP) from Pytorch3D may be used since it has been found to be significantly faster and more stable than methods based on declarative layers.

Volumetric Skinning

Volumetric skinning to deform a character's skin following the motion of an underlying abstract skeleton is used to deform the canonical volumetric object representation into its representation in the driving pose. The deformation can be completely described by establishing correspondences between each point xd in the deformed space and points $x_c$ in the canonical space. Such correspondence is established through Linear Blend Skinning (LBS) as follows:

$$x_d = \sum_{p=1}^{N_p} w_p^c(x_c)(R_p x_c + t_p) \quad (3)$$

where $w_p^c(x)$ is a weight assigned to each part p. Intuitively, LBS weights segment the object into different parts. As an example, a point with LBS weight equal to 1.0 for the left hand will move according to the transformation for the left hand. Unfortunately, during volumetric rendering canonical points may need to be queried using points in the deformed space, requiring solving Equation (3) for $x_c$. This procedure is prohibitively expensive, so the approximate solution introduced in HumanNeRF may be used, which defines inverse LBS weights $w_p^d$ such that:

$$x_c = \sum_{p=1}^{N_p} w_p(x_d)(R_p^{-1} x_d - R_p^{-1} t_p) \quad (4)$$

where weights $w_p^d$ are defined as follows:

$$w_p(x_d) = \frac{w_p^c(R_p^{-1} x_d - R_p^{-1} t_p)}{\sum_{p=1}^{N_p} w_p^c(R_p^{-1} x_d - R_p^{-1} t_p)} \quad (5)$$

This approximation has an intuitive explanation, i.e., given the deformed point, it is projected using the inverse $T_p$ to the canonical pose and checked if it corresponds to the part p in canonical pose. It is easy to see that if each point has a strict assignment to a single part and there is no self-penetration in the deformed space, the approximation is exact. In an example configuration, $w_p$ is parameterized as the channel-wise softmax of $V^{LBS}$. Examples of the parts are given in FIGS. 1 and 2.

Volumetric Rendering

The deformed object is rendered using differentiable volumetric rendering. Given camera intrinsics and extrinsics, a ray r is cast through each pixel in the image plane and the color c associated to each ray is computed by integration as:

$$c(r) = \int_{t_n}^{t_f} e^{-\int_{t_n}^{t} \sigma(r(s))ds} \sigma(r(t))c(r(t))dt \quad (6)$$

where σ and c are functions mapping each 3D point along each ray r(t) to the respective volume density and radiance. In the UVA framework, σ is parametrized as $V^{Density}$ and c is parameterized as $V^{RGB}$ and can be efficiently queried using trilinear interpolation. The UVA model is trained using a camera with fixed extrinsics initialized to the identity matrix, and fixed intrinsics. To reduce computational resources, the images are rendered directly from voxels without an additional multi-layer perceptron (MLP), nor is any upsampling technique used.

In addition, it is assumed that the background is flat and it is not moving. The background is thus modeled as a plate of fixed, high density. This density is modeled with a single dedicated volume, while the color is obtained from $V^{RGB}$.

Training

The UVA framework was trained on three diverse datasets containing images or videos of various objects. The UVA method learns meaningful 3D geometry when trained on still images of cat faces. The UVA method was trained on the VoxCeleb and TEDXPeople video datasets as driving images from which poses or sequences of poses were extracted to evaluate 3D animation. Since the method provides unsupervised 3D animation, evaluation metrics are further introduced to assess novel view synthesis and animation quality when only single-view data is available.

Learning a 3D representation of an articulated object from 2D observations without additional supervision is a highly ambiguous task, prone to spurious solutions with poor underlying geometry that leads to corrupted renderings if the camera is moved away from the origin. A two-stage training strategy was thus devised that promotes learning of correct 3D representations. First, the UVA model may be trained with only a single part, e.g., Np=1. This allows the UVA model to obtain meaningful estimation of the object geometry by pretraining a Geometry phase or G-phase. During a second phase, $N_p$=10 parts were introduced, and the UVA model was allowed to learn the pose of each part. All the weights from the G-phase were copied. Moreover, for C the weight of the final layer was extended such that all the part predictions were the same as in the first stage, while for G, additional weights were added for $V^{LBS}$ initialized to zero. The model was trained using a range of losses.

For reconstruction loss, a perceptual reconstruction loss was used as the main driving loss. Similarly to a first order motion model (FOMM) for image animation, a pyramid of resolutions was used:

$$\mathcal{L}_r = \sum_l \sum_i |VGG_i(D_l \odot \hat{F}) - VGG_i(D_l \odot F)| \quad (7)$$

where $VGG_i$ is the $i^{th}$-layer of a pretrained VGG-19 network, and DI is a downsampling operator corresponding to the current resolution in the pyramid. The same loss is enforced for $F^{low}$.

For unsupervised background loss, the generator G 210 mostly relies on appearance features rather than motion cues, thus it is harder for generator G 210 to disentangle the background from the foreground. In a first stage, the UVA model is encouraged to correctly disentangle the background from the foreground by leveraging a coarse background mask B that is obtained in an unsupervised manner from MRAA. Given the occupancy map O for the foreground part obtainable by evaluating Equation (6) excluding the background, a cross entropy loss is enforced:

$$\mathcal{L}_{bkg} = \sum_i O\log(1 - B) + (1 - O)\log B \quad (8)$$

The background mask B is coarse and is useful in early iterations to avoid degenerate solutions. Thus, the contribution of this loss is reduced for each epoch.

For pose losses, to regularize the PnP-based pose prediction two regularization terms are added: equivariance and projection. One is a standard technique for regularizing unsupervised keypoints:

$$\mathcal{L}_{eq} = |A \circ C(F) - C(W(F, A))| \quad (9)$$

where A is a random affine transformation, and W is a warping operation. The intuition behind this loss is that when an image is deformed, its keypoints should undergo a similar deformation. Second, the K3D reprojection error is explicitly minimized with $K^{2D}$:

$$\mathcal{L}_{proj} = \sum_p |K_p^{2D} - \prod(K_p^{3D}, T_p)| \quad (10)$$

where $\Pi_p$ projects the points according to the estimated camera pose $T_p$. This pose loss enforces keypoints to comply with the predicted camera transformation $T_p$, thus improving the stability of the PnP algorithm.

The final loss is the sum of all terms with equal weights. For the second stage $L_{bkg}$ is not used.

Inference

During inference, poses are extracted from the input frame $F_i$ and processed by the UVA framework 200 to generate a sequence of poses. The process may be applied for any input object rather than a specified object.

Despite the UVA model learning the embedding space for the identities in the training set, it can be used to model previously unseen identities. Given an image of an unseen identity $F_{test}$ and a randomly initialized embedding $e_{test}$, the reconstruction loss Lr (Equation (7)) is optimized with respect to the embedding $e_{test}$. This procedure produces a volumetric representation with detailed geometry, but imperfect textures. This issue is addressed by finetuning the generator G 210, following the pivotal tuning procedure. In order to avoid significant distortions to the geometry, during this finetuning stage, $V^{Density}$ and $V^{LBS}$ are regularized to stay close to their values prior to finetuning. The optimization is with respect to the appearance; the 2D keypoint predictor C is not modified, ensuring that motion can be transferred from different objects.

Experiments

Evaluating animation, whether 2D or 3D, is a challenging task as there is no ground truth for the animated images. An evaluation protocol is established below for unsupervised volumetric animation. The UVA protocol makes use of established metrics in unsupervised 2D animation, when applicable, and introduces procedures to evaluate the quality of the synthesized 3D geometry and animation under novel views.

The UVA method was evaluated using three publicly available datasets: 1) Cats, consisting of 9,993 images of cat faces (9,793 cat faces were used for training and 200 cat faces were used for testing); 2) VoxCeleb, employing the same preprocessing as FOMM, uses 19522 face videos for training and 100 for testing; and 3) TEDXPeople, which is a video dataset of TEDx speakers. Using timestamps, continuous video chunks were extracted. In total, 40896 videos were employed for training, and 100 videos were retained for testing.

The UVA method learns high-fidelity geometry from images or videos without camera or geometry supervision. This is a challenging setting, even for recent 3D generative adversarial networks (3D-GANs), as they require camera supervision. In this setting, the quality of inferred geometry is compared to a state-of-the-art 3D-GAN, EpiGRAF, which is trained with ground truth camera poses. As both UVA and EpiGRAF render non-absolute depth, to evaluate its quality, the Pearson correlation coefficient was used. Given a test image, it was reconstructed by inversion, and depth was obtained using volumetric rendering. The correlation between the predicted depth and the depth estimated with an off-the-shell depth estimator was then measured. For a fair comparison, during inversion, camera poses to EpiGRAF were not provided and they were instead found during the optimization, in combination with the rest of the parameters. UVA was found to provide higher-quality depth, while not requiring camera supervision during training, reaching a correlation value of 0.63. EpiGRAF reached 0.53, often failing to render accurate depth for non-frontal cameras.

A notable feature of 3D animation is the ability to change the viewpoint from which the object is rendered during animation. Commonly used animation datasets, however, do not typically offer multi-view data. To evaluate viewpoint consistency without access to multi-view data, three new metrics are introduced: Average Yaw Deviation (AYD), Average Shape Consistency (ASC), and Average Pose Consistency (APC). In more detail, given an object, it is rotated along the y-axis using a set of predefined angles. A skinned multi-person linear (SMPL) model for humans and a 3D movie maker (3DMM) model for faces were then fitted to the frontal and rotated views of the objects. These models estimate the root angle, defining how the object is oriented with respect to the camera; a shape parameter, defining the identity of the object; and a parameter defining its pose (in terms of joint rotations for SMPL and facial expression parameters for 3DMM).

To evaluate the ability of the UVA model to rotate the object by the desired angle to produce novel views, AYD was used. In particular, the y-axis component of the root angle between the rotated and non-rotated object was computed and compared with the known yaw of the camera used to render that view. ASC was used to compare the consistency of the shape parameters between the frontal and rotated views. A lower ASC indicates that the identity is better preserved during rotation. APC was used to measure how much the pose was altered during rotation, with a lower APC indicating better preservation of the object pose. These metrics enable evaluating the capabilities of competing models in generating view-consistent results.

Figure 4:
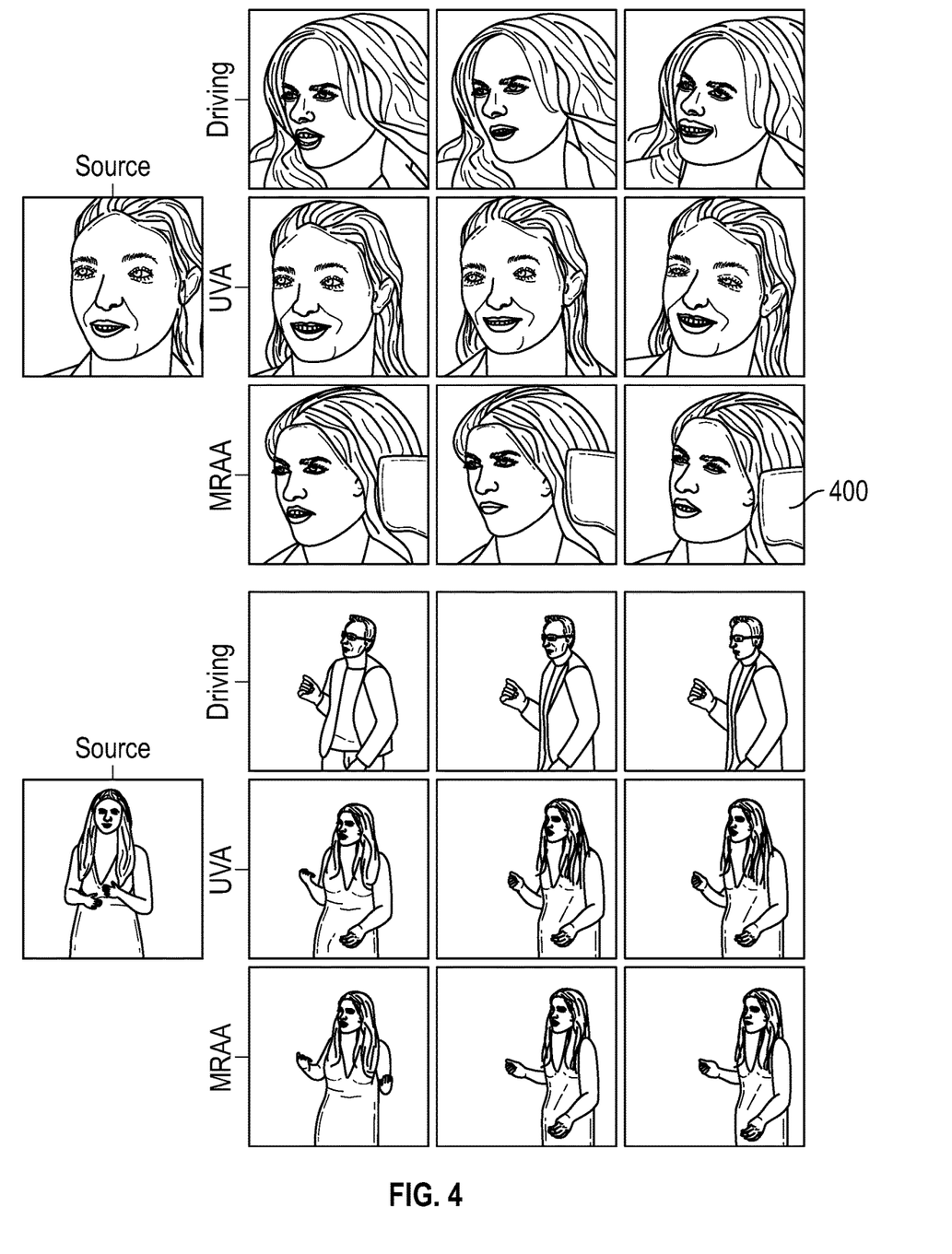
FIG. 4 is an illustration comparing example 2D animations on bodies and faces using the UVA method and a prior art method when the pose of the source and driving images differ significantly.

As no known prior unsupervised animation method offers a built-in ability to generate the data under novel views, a simple, depth-based method was provided to generate novel views. First, the depth from a monocular depth predictor was predicted and normalized to make it compatible with the camera intrinsics. Then, for each method, parts and their affine transformations were estimated. A central 2D keypoint was chosen for each part, and it was augmented with 4 additional keypoints in its neighborhood. Using the depth, the keypoints in 3D were lifted and re-projected into the novel viewpoint. From these new keypoints, a new affine transformation was estimated and used to drive the view synthesis. The results were then evaluated against latent image animation (LIA), which expresses animation as linear navigation in a latent space. For the VoxCeleb dataset, one of the components of its latent space was found to correlate with the rotation of the head along the y-axis. Exploiting this finding, a linear model mapping the magnitude of the movement along this latent component was fitted to the produced head rotation and used to generate the head under novel viewpoints.

filter out some occlusions to better preserve a object's shapes when animated, as seen in the third column in FIG. 4, while MRAA produces artifacts 400 in the occluded region.

TABLE 1

| Method | VoxCeleb | | | | | | TEDXPeople | | | | | |
|---|---|---|---|---|---|---|---|---|---|---|---|---|
|  | AYD↓ | ASC↓ | APC↓ | LI↓ | AKD↓ | AED↓ | AYD↓ | ASC↓ | APC↓ | LI↓ | (AKD↓, MKR↓) | AED↓ |
| FOMM [40] | 0.655 | 0.129 | 0.177 | 0.0413 | 1.289 | 0.134 | 0.507 | 0.028 | 1.07 | 0.0318 | (3.248, 0.009) | 0 120 |
| MRAA [42] | 0.173 | 0.123 | 0.174 | 0.0424 | 1.250 | 0.131 | 0.181 | 0.023 | 0.702 | 0.0262 | (2.282, 0.007) | 0.101 |
| LIA [49] | 0.207 | 0.130 | 0.190 | 0.0529 | 1.437 | 0.138 | — | — | — | — | — | — |
| Our 1 frame | 0.051 | 0.078 | 0.144 | 0.0655 | 1.737 | 0.226 | 0.128 | 0.019 | 0.635 | 0.0474 | (3.571, 0.017) | 0.163 |
| Our 5 frame | 0.045 | 0.091 | 0.112 | 0.0418 | 1.378 | 0.111 | 0.107 | 0.021 | 0.571 | 0.029 | (2.373, 0.014) | 0.086 |

The standard 2D reconstruction metrics were used: L1, AKD/MKR, and AED. However, such metrics favor 2D methods, which can solve the 2D animation problem by copying pixels from the source to the target view at the cost of limited 3D understanding and consistency. In contrast, UVA renders view-consistent pixel values from a 3D representation, making this shortcut unavailable. A significant gap may also be introduced by the single-image embedding procedure adopted by the UVA method. However, as the embedding procedure in the UVA method seamlessly supports the use of multiple source frames at inference time, a shared representation can be optimized, pooling information from all available frames to improve performance. The results of the UVA model were demonstrated with one and five frames.

Figure 5:
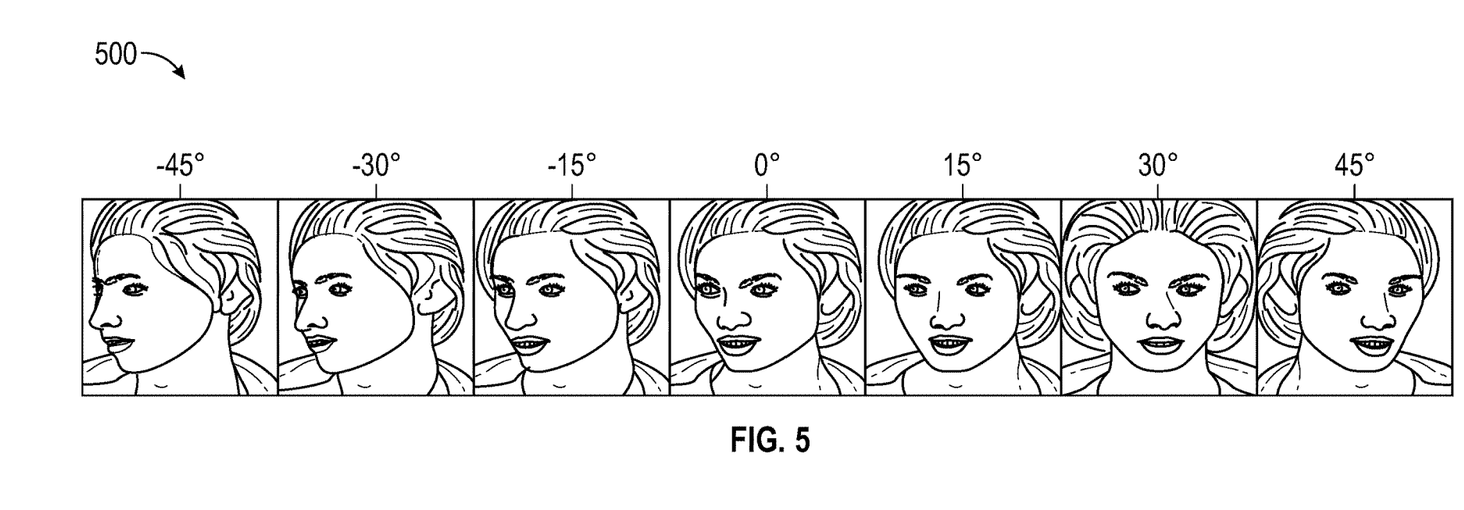
FIG. 5 is an illustration depicting typical examples of novel views synthesized by the UVA framework using a single input image.

FIG. 5 shows typical examples of novel views 500 synthesized by the UVA framework 200 using a single input image. Despite a wide range of viewpoints in different videos, subjects in each individual video in VoxCeleb and TEDXPeople had very limited 3D rotations, as they primarily face towards the camera. Thus, standard reconstruction metrics do not reflect the model's capacity to perform complex 3D transformations.

The quantitative comparison results are provided in Table 1. As the affine transformations of FOMM are mostly based on edge detection that is not very robust, a minor modification of this transformations for novel view synthesis leads to significant movement. Thus, FOMM has the worst AYD among all compared methods. Affine estimation in MRAA, in contrast, is significantly more robust, and thus it has a significantly lower AYD. However, MRAA does not have enough knowledge about the 3D structure of the objects, treating them as planes—while they roughly preserve the shape and pose for small angles, for larger angles objects become thinner, until they eventually disappear. LIA has a rotation direction that is entangled with the other movements, and thus it has the lowest ASC and APC. The UVA model is shown to be the best at preserving shape and expressions, as judged by the ASC and APC. Moreover, the UVA model also provides the most meaningful rotations as judged by the AYD. When standard reconstruction metrics are considered, the 5 frame model performs on par with the baselines. However, these metrics do not reflect the ability of the UVA model to perform complex 3D movements. This point is further highlighted in the example 2D animations on bodies and faces in FIG. 4 when the pose of the source and driving images differ significantly. MRAA fails to properly reflect that, while the UVA model produces more consistent results. Also, as the UVA model is based on learning a 3D prior in canonical 3D space and not copying pixels, it can Ablation Studies Design choices made in the UVA framework were evaluated. First, the PnP-based part pose predictor was compared with direct part pose prediction (Direct). As directly predicting an $R^{3\times 3}$ rotation matrix could produce solutions not corresponding to a rigid rotation, the 6D rotation parameterization was adopted. The geometry learned by this approach was essentially flat. The UVA method and Direct were compared only in the geometry phase of training (e.g., when $N_P=1$), as it does not produce sufficiently accurate geometry to proceed with the next phase. The effect of the unsupervised background loss $L_{bkg}$ was demonstrated by training the UVA model without this loss (no background). The importance of two-phase training was investigated by learning a model with multiple parts without the geometry phase (No G-phase). The numerical results are shown in Table 2. As shown, the full UVA model ($N_P=10$) achieves the best scores and generates higher fidelity novel views and geometric details. The utility of the geometry phase is clearly demonstrated by the scores and qualitative results, which, without this phase, produce corrupted results and did not learn representative parts. While it produces meaningful depth, the UVA model trained without $L_{bkg}$ failed to separate the background and foreground

TABLE 2

| Method | AYD↓ | ASC↓ | APC↓ | LI↓ | AKD↓ | AED↓ |
|---|---|---|---|---|---|---|
| Direct $N_p = 1$ | 0.707 | 0.160 | 0.239 | 0.0723 | 3.582 | 0.326 |
| No BG $N_p = 1$ | 0.301 | 0.117 | 0.216 | 0.0702 | 2.410 | 0.263 |
| Our $N_p = 1$ | 0.141 | 0.113 | 0.210 | 0.0637 | 2.170 | 0.242 |
| No G-phase $N_p = 10$ | 1.08 | 0.145 | 0.226 | 0.0620 | 1.993 | 0.243 |
| Our $N_p = 10$ | 0.051 | 0.078 | 0.144 | 0.0655 | 1.737 | 0.226 |

To further evaluate the quality of the learned geometry, experiments were run on images from two synthetically rendered datasets providing ground truth depth: 1) high-quality, portrait-style facial images; and 2) full-body renderings of animated subjects. These datasets contained subjects with widely varying identities, poses, hairstyles, and attire, rendered in different environments and lighting conditions. However, for these experiments synthetic data was not relied upon for training, instead using models pretrained on 2D images from VoxCeleb or TEDXPeople for faces or bodies, respectively. Despite the domain gap between the training and evaluation data, high-quality depth estimates were obtained for these synthetic renderings using models trained only on real, in-the-wild images. Given a synthetic input image, it is inverted and the Pearson correlation coefficient between the UVA method's inferred depth and the ground truth is computed. For these experiments, as the geometry of the target object was the main concern, the depth for background regions was masked out, computing the correlation only between the depths of foreground pixels. The predicted depth was compared with the general purpose state-of-the-art depth predictor Omnidata. The depth correlation for Omnidata was 0.602 for faces and 0.470 for bodies, while for the UVA method they were 0.793 and 0.568, respectively. These results demonstrate that the UVA method learns meaningful geometric representations, even for significantly out-of-distribution inference data.

CONCLUSION

Unsupervised volumetric animation demonstrates a significant step towards 3D animation of dynamic objects. While trained exclusively on real-world monocular 2D videos, the UVA method obtained high quality geometry, object parts, 3D segmentation and normals. Due to the unsupervised nature of the UVA method, the same approach applies to a variety of object categories without using explicit labels or other cumbersome supervision. This understanding of the underlying geometry and structure of the object allows the UVA method to perform animation and novel view synthesis at the same time. These properties open possibilities for employing this information for controlling an object's fine-grained shape, or relighting it for composition into novel environments.

Processing Platform

Figure 6:
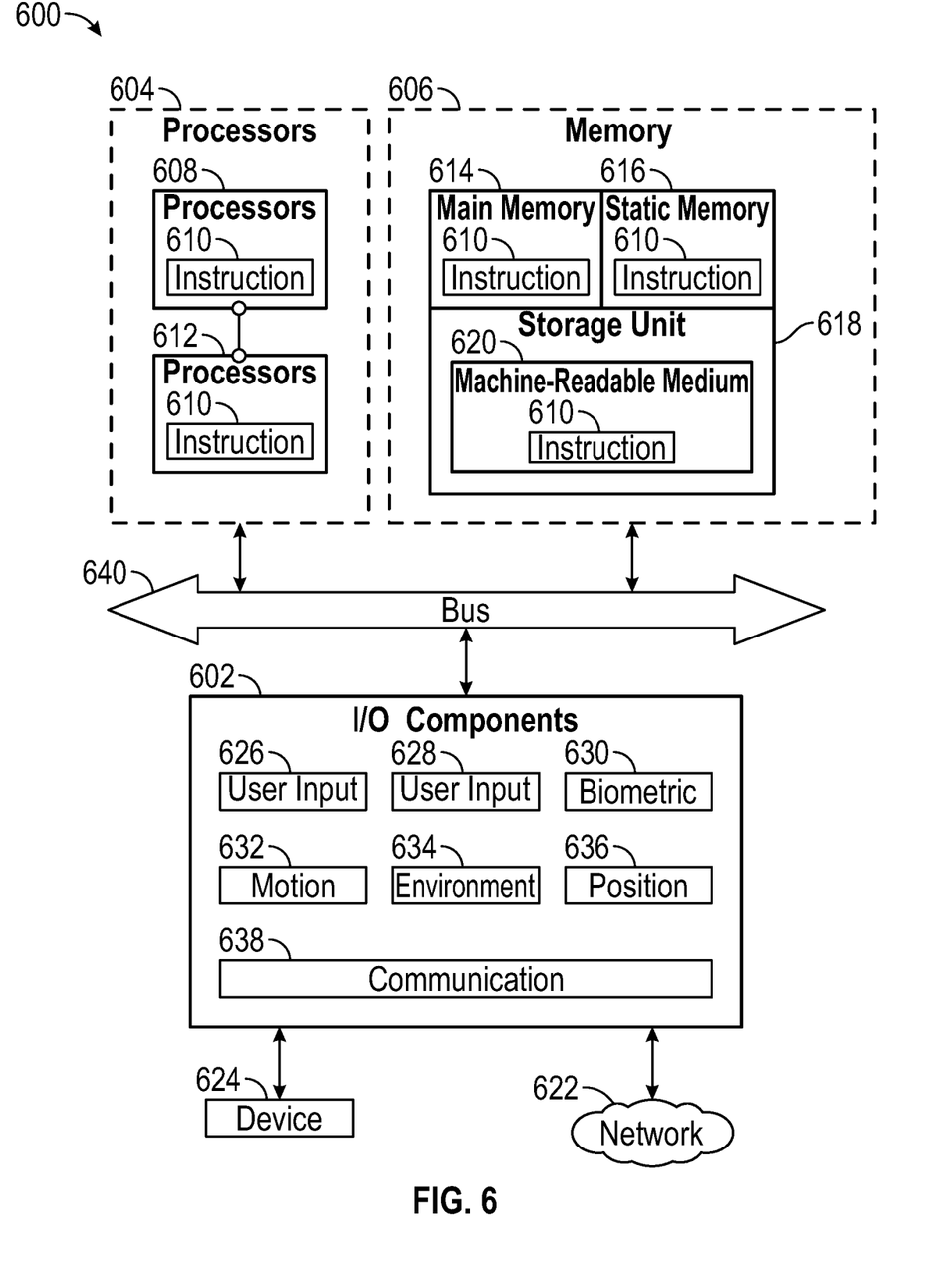
FIG. 6 is a block diagram of a machine within which instructions for causing the machine to perform one or more of the methodologies discussed herein may be executed.

FIG. 6 is a diagrammatic representation of the machine 600 within which instructions 610 (e.g., software, a program, an application, an applet, an app, or other executable code) for causing the machine 600 to perform one or more of the methodologies discussed herein may be executed. For example, the instructions 610 may cause the machine 600 to execute one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may include, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform one or more of the methodologies discussed herein. The machine 600, for example, may include the unsupervised volumetric animation (UVA) framework 200 of FIG. 2 and UVA method 300 of FIG. 3. In some examples, the machine 600 may also include both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may include two or more independent processors (sometimes referred to as "cores") that may execute instructions contemporaneously. Although FIG. 6 shows multiple processors 604, the machine 600 may include a single processor with a single core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 614, the static memory 616, and storage unit 618 store the instructions 610 for one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Figure 7:
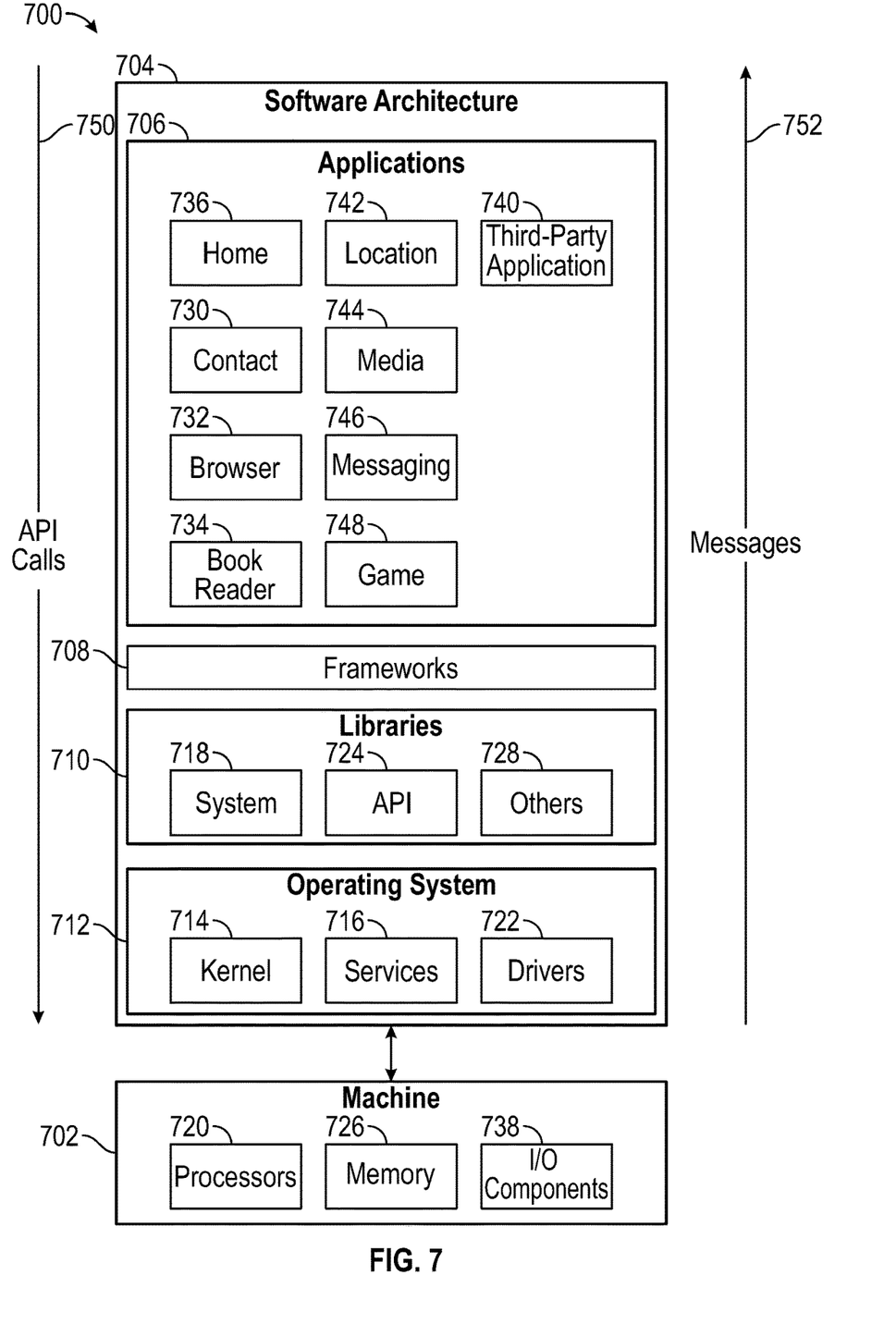
FIG. 7 is a block diagram showing a software architecture within which examples described herein may be implemented.

FIG. 7 is a block diagram 700 illustrating a software architecture 704, which can be installed on one or more of the devices described herein. The software architecture 704 is supported by hardware such as a machine 702 (see FIG. 6) that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to generate one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component includes a general-purpose processor configured by software to become a special-purpose processor, the general-purpose processor may be configured as respectively different special-purpose processors (e.g., including different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. An unsupervised volumetric animation system for three-dimensional (3D) animation of a non-rigid deformable object, comprising:
    a canonical voxel generator to produce a 3D volumetric representation of the non-rigid deformable object in a canonical pose parameterized as a voxel grid, wherein the non-rigid deformable object is represented as a set of moving rigid parts, and assigns each 3D point of the non-rigid deformable object to a corresponding moving rigid part of the non-rigid deformable object;
    a two-dimensional (2D) keypoint predictor to estimate a pose, in a given image frame, of each moving rigid part of an input object to be animated;
    a volumetric skinning algorithm to map a canonical object volume of the non-rigid deformable object into a deformed volume that represents, as a deformed object, the input object to be animated with the pose in a current frame; and
    a volumetric renderer to render the deformed object as an image of the input object.

2. The system of claim 1, wherein the input object to be animated is extracted from a video or a still image.

3. The system of claim 1, wherein the 2D keypoint predictor uses a pose extracted from the input object to be animated to predict a set of 2D keypoints that correspond to 3D keypoints of the input object to be animated.

4. The system of claim 3, wherein the volumetric renderer takes a deformed density and radiance of the deformed volume produced via volumetric skinning using a canonical density ($V^{DENSITY}$) of the non-rigid deformable object, a radiance of the non-rigid deformable object, a set of poses for different moving rigid parts of the input object to be animated, and moving rigid parts of the input object to be animated represented as linear blend skinning (LBS) weights.

5. The system of claim 4, wherein the volumetric renderer volumetrically renders the deformed radiance to produce the image.

6. The system of claim 1, wherein the 2D keypoint predictor estimates the pose of each moving rigid part by learning a set of 3D keypoints in a canonical space and comprises a 2D convolutional neural network that detects 2D projections of the moving rigid part to provide a set of corresponding 2D keypoints in a current frame.

7. The system of claim 6, further comprising a perspective-n-point (PnP) algorithm that processes a differentiable PnP formulation to recover the pose of each moving rigid part from corresponding 2D keypoints and 3D keypoints.

8. The system of claim 7, wherein the 2D keypoint predictor introduces $N_k$ learnable canonical 3D keypoints for each moving rigid part, shares 3D keypoints $K_p^{3D}$ of the moving rigid part among objects in a dataset, defines a 2D keypoints prediction network C that takes frame $F_i$ as input and outputs 2D keypoints $K_p^{2D}$ for each part p, where each 2D keypoint corresponds to its respective 3D keypoint, and recovers the pose of moving rigid part p as:

$$T_p^{-1} = PnP(K_p^{2D}, K_p^{3D}) = PnP(C(F_i), K_p^{3D}).$$

9. A method of providing three-dimensional (3D) animation of a non-rigid deformable object, comprising:
producing, using a canonical voxel generator, a 3D volumetric representation of the non-rigid deformable object in a canonical pose parameterized as a voxel grid, wherein the non-rigid deformable object is represented as a set of moving rigid parts;
assigning, by the canonical voxel generator, each 3D point of the non-rigid deformable object to a corresponding moving rigid part of the non-rigid deformable object;
estimating, by a two-dimensional (2D) keypoint predictor, a pose, in a given image frame, of each moving rigid part of an input object to be animated;
mapping, by a volumetric skinning algorithm, a canonical object volume of the non-rigid deformable object into a deformed volume that represents, as a deformed object, the input object to be animated with the pose in a current frame; and
rendering, by a volumetric renderer, the deformed object as an image of the input object.

10. The method of claim 9, further comprising extracting the input object to be animated from a video or a still image.

11. The method of claim 9, wherein the assigning comprises learning, for each moving rigid part, a set of canonical 3D keypoints during training.

12. The method of claim 9, further comprising using, by the 2D keypoint predictor, a pose extracted from the input object to be animated to predict a set of 2D keypoints that correspond to 3D keypoints of the input object to be animated.

13. The method of claim 12, wherein the mapping comprises the volumetric renderer taking a deformed density and radiance of the deformed volume produced via volumetric skinning using a canonical density ($V^{DENSITY}$) of the non-rigid deformable object, a radiance of the non-rigid deformable object, a set of poses for different moving rigid parts of the input object to be animated, and moving rigid parts of the input object to be animated represented as linear blend skinning (LBS) weights.

14. The method of claim 13, wherein the rendering comprises volumetrically rendering the deformed radiance by the volumetric renderer to produce the image.

15. The method of claim 9, wherein estimating the pose of each moving rigid part comprises learning a set of 3D keypoints in a canonical space and detecting 2D projections of the moving rigid part to provide a set of corresponding 2D keypoints in a current frame using a 2D convolutional neural network.

16. The method of claim 15, wherein the estimating the pose of each moving rigid part further comprises using, by a perspective-n-point (PnP) algorithm, a differentiable PnP formulation to recover the pose of each moving rigid part from corresponding 2D keypoints and 3D keypoints.

17. The method of claim 16, further comprising introducing $N_k$ learnable canonical 3D keypoints for each moving rigid part, sharing 3D keypoints $K_p^{3D}$ of the moving rigid part among objects in a dataset, defining a 2D keypoints prediction network C that takes frame $F_i$ as input and outputs 2D keypoints $K_p^{2D}$ for each part p, where each 2D keypoint corresponds to its respective 3D keypoint, and recovering the pose of moving rigid part p as:

$$T_p^{-1} = PnP(K_p^{2D}, K_p^{3D}) = PnP(C(F_i), K_p^{3D}).$$

18. The method of claim 17, further comprising sharing the 3D keypoints for all the objects in the dataset, whereby all objects in the dataset share a same canonical space for poses.

19. A non-transitory computer-readable storage medium, the computer-readable storage medium including instructions that when executed by a processor cause the processor to animate a three-dimensional (3D) non-rigid deformable object extracted from a video or a still image by performing operations comprising:
producing, using a canonical voxel generator, a 3D volumetric representation of the non-rigid deformable object in a canonical pose parameterized as a voxel grid, wherein the non-rigid deformable object is represented as a set of moving rigid parts;
assigning, by the canonical voxel generator, each 3D point of the non-rigid deformable object to a corresponding moving rigid part of the non-rigid deformable object;
estimating, by a two-dimensional (2D) keypoint predictor, a pose, in a given image frame, of each moving rigid part of an input object to be animated;
mapping, by a volumetric skinning algorithm, a canonical object volume of the non-rigid deformable object into a deformed volume that represents, as a deformed object, the input object to be animated with the pose in a current frame; and
rendering, by a volumetric renderer, the deformed object as an image of the input object.

20. The medium of claim 19, wherein the instructions for assigning each 3D point of the non-rigid deformable object to the corresponding moving rigid part of the non-rigid deformable object comprises executing instructions to learn, for each moving rigid part, a set of canonical 3D keypoints during training.

* * * * *